US011304253B1

(12) United States Patent
Lewis et al.

(10) Patent No.: US 11,304,253 B1
(45) Date of Patent: Apr. 12, 2022

(54) COORDINATED TRANSMISSIONS OVER A TRANSIENT ROVING WIRELESS COMMUNICATION CHANNEL

(71) Applicant: Skylo Technologies, Inc., Palo Alto, CA (US)

(72) Inventors: Vijay Lewis, Wylie, TX (US); Meghna Agrawal, Cupertino, CA (US); Keijo Tapio Lehtinen, Espoo (FI); Yihenew Dagne Beyene, Espoo (FI); Christopher Acker, Los Altos, CA (US); Rounak Salim, Mountain View, CA (US); Andrew Nuttall, Mountain View, CA (US)

( * ) Notice: Subject to any disclaimer, the term of this patent is extended or adjusted under 35 U.S.C. 154(b) by 0 days.

(21) Appl. No.: 17/151,143

(22) Filed: Jan. 16, 2021

(51) Int. Cl.
*H04W 76/15* (2018.01)
*H04W 16/32* (2009.01)
*H04W 16/18* (2009.01)
*H04B 7/185* (2006.01)
*H04W 16/28* (2009.01)

(52) U.S. Cl.
CPC ........ *H04W 76/15* (2018.02); *H04B 7/18513* (2013.01); *H04B 7/18563* (2013.01); *H04W 16/18* (2013.01); *H04W 16/28* (2013.01); *H04W 16/32* (2013.01)

(58) Field of Classification Search
CPC ..... H04W 76/15; H04W 16/18; H04W 16/28; H04W 16/32; H04W 64/00; H04W 4/33; H04W 84/12; H04W 4/90; H04W 4/029; H04W 88/08; H04W 88/02; H04B 7/18513; H04B 7/18563; H04B 17/318; G01S 1/0428; G01S 5/0252; G01S 1/042; G01S 19/46; G01S 5/02; G01S 5/0081; G01S 5/0242; G06F 3/0481
See application file for complete search history.

(56) References Cited

U.S. PATENT DOCUMENTS

| | | | |
|---|---|---|---|
| 6,993,361 B2 | 1/2006 | Chitrapu | |
| 7,636,567 B2 | 12/2009 | Karabinis et al. | |
| 8,433,241 B2 | 4/2013 | Dutta et al. | |
| 8,923,850 B2 | 12/2014 | Karabinis | |
| 2003/0195017 A1 | 10/2003 | Chen et al. | |
| 2011/0105146 A1* | 5/2011 | Chandrasekaran ... | H04L 63/107 455/456.1 |
| 2016/0255463 A1* | 9/2016 | Das ....................... | H04W 64/00 455/456.1 |
| 2018/0020451 A1* | 1/2018 | Khan ................. | H04B 7/15542 |

(Continued)

*Primary Examiner* — Fred A Casca
(74) *Attorney, Agent, or Firm* — Brian R. Short (57) ABSTRACT

Apparatuses, methods, and systems for coordinating wireless communication are disclosed. One method includes generating, by a wireless radiator, a plurality of selectable directional wireless communication links capable of providing connectivity across a plurality of cells, wherein each of the cells is spatially different from other cells, and wherein each of the cells covers a cell area, wherein a plurality of hubs are located within the cell area, generating, by a controller, a cell map, wherein the cell map maps which of the directional wireless links, which of the plurality cells, and which of the hubs are active as a function of time, thereby supporting a wireless communication link between the base station and the hubs of the cell area corresponding with the active directional wireless link, and providing the cell map to the base station and the hubs of each of the cells.

18 Claims, 10 Drawing Sheets

(56) References Cited

U.S. PATENT DOCUMENTS

2019/0253862 A1* 8/2019 Park .................. H04W 4/90
2020/0120735 A1* 4/2020 Wang ................ H04W 24/10
2020/0314724 A1* 10/2020 Kyung ............ H04W 72/1284

* cited by examiner

Generating, by a wireless radiator, a plurality of selectable directional wireless communication links capable of providing connectivity across a plurality of cells, wherein each of the plurality of cells is spatially different from other cells, and wherein each of the plurality of cells covers a cell area, wherein a plurality of hubs are located within the cell area

1010

Generating, by a controller, a cell map, wherein the cell map maps which of the plurality of directional wireless links, which of the plurality of cells, and which of the plurality of hubs are active as a function of time, thereby supporting a wireless communication link between the base station and the plurality of hubs of the cell area corresponding with the active directional wireless link

1020

Providing, by the controller, the cell map to the base station and the plurality of hubs of each of the cells

COORDINATED TRANSMISSIONS OVER A TRANSIENT ROVING WIRELESS COMMUNICATION CHANNEL

FIELD OF THE DESCRIBED EMBODIMENTS

The described embodiments relate generally to wireless communications. More particularly, the described embodiments relate to systems, methods and apparatuses for coordinated transmissions over a transient roving wireless communication channel.

BACKGROUND

The Internet of Things (IoT) includes large numbers of devices being connected to the internet. The devices can be located in remote places all over the world.

It is desirable to have methods, apparatuses, and systems for coordinated transmissions over a transient roving wireless communication channel.

SUMMARY

An embodiment includes a system for coordinating wireless communication between a base station and a plurality of hubs. The system includes a wireless radiator, a controller, and the plurality of hubs. The wireless radiator is operative to generate a plurality of selectable directional wireless communication links capable of providing connectivity across a plurality of cells, wherein each of the plurality of cells is spatially different from other cells, and wherein each of the plurality of cells covers a cell area, wherein a plurality of hubs are located within the cell area. The controller is operative to generate a cell map, wherein the cell map maps which of the plurality of directional wireless links, which of the plurality of cells, and which of the plurality of hubs are active as a function of time, thereby supporting a wireless communication link between the base station and the plurality of hubs of the cell area corresponding with the active directional wireless link, and provide the cell map to the base station and the plurality of hubs of each of the cells.

Another embodiment includes a method for coordinating wireless communication between a base station and a plurality of hubs. The method includes generating, by a wireless radiator, a plurality of selectable directional wireless communication links capable of providing connectivity across a plurality of cells, wherein each of the plurality of cells is spatially different from other cells, and wherein each of the plurality of cells covers a cell area, wherein a plurality of hubs are located within the cell area, generating, by a controller, a cell map, wherein the cell map maps which of the plurality of directional wireless links, which of the plurality of cells, and which of the plurality of hubs are active as a function of time, thereby supporting a wireless communication link between the base station and the plurality of hubs of the cell area corresponding with the active directional wireless link, and providing, by the controller, the cell map to the base station and the plurality of hubs of each of the cells.

Other aspects and advantages of the described embodiments will become apparent from the following detailed description, taken in conjunction with the accompanying drawings, illustrating by way of example the principles of the described embodiments.

DETAILED DESCRIPTION

The embodiments described include methods, apparatuses, and systems for coordinated transmissions over a transient roving wireless communication channel. For an embodiment, the transient roving wireless communication channel includes a plurality of directional wireless links that are each activated according to a cell map. An active directional wireless link provides a wireless communication link between a base station and hubs that are located within an area (cell or cell area) covered by the active directional wireless link. For an embodiment, the active directional wireless links are formed by an antenna beamforming pattern generated by a satellite (wireless radiator). For an embodiment, a wireless link is formed between the base station and the satellite, and the active directional wireless links are formed between the satellite and the hubs, thereby providing the wireless communication link between the base station and the hubs. Each directional wireless link radiates over a cell, and each of the cells and hubs within the cells are activated according to the cell map. For various embodiments, the wireless radiator can include a satellite, a cell tower, a small cell, or a Wi-Fi hot spot.

Figure 1:
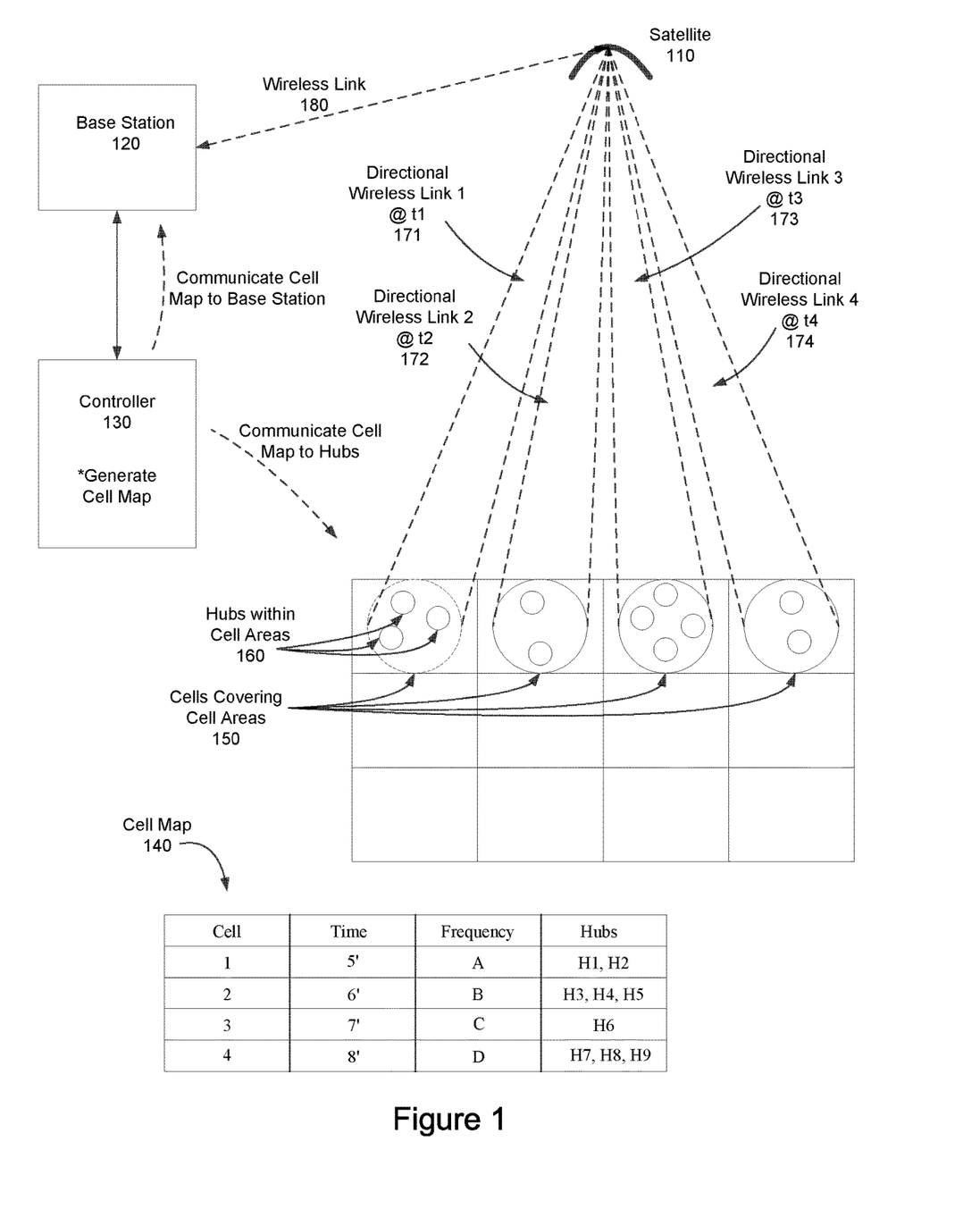
FIG. 1 shows a base station wirelessly communicating with a plurality of hubs through a satellite and a plurality of directional wireless links of the satellite, according to an embodiment.

FIG. 1 shows a base station 120 wirelessly communicating with a plurality of hubs through a satellite (wireless radiator) 110 and a plurality of directional wireless links 171, 172, 173, 174 formed by one or more antennas of the satellite 110, according to an embodiment. For an embodiment, a wireless communication system includes a controller 130, the base station 120, the satellite 110, and the plurality of hubs.

For an embodiment, the satellite (that is, the wireless radiator) 110 operates to generate the plurality of selectable directional wireless communication links 171, 172, 173, 174 capable of providing connectivity across a plurality of cells 150, wherein each of the plurality of cells 150 is spatially different from other cells, and wherein each of the plurality of cells covers a cell area, and wherein a plurality of hubs 160 are located within the cell area. That is, each of the selectable directional wireless communication links 171, 172, 173, 174 includes a wireless beam that covers a corresponding cell area which defines the corresponding cell 150. For an embodiment, a subset (such as one) of the plurality of selectable directional wireless communication links 171, 172, 173, 174 is active at a time, and accordingly, only a subset (such as one) of the cells is active at a time. Hubs located within a cell that is active are able to wirelessly communicate with the base station 120 through the satellite 110.

For an embodiment, the controller 130 operates or is configured to generate a cell map 140, wherein the cell map 140 maps which of the plurality of directional wireless links 171, 172, 173, 174, which of the plurality of plurality cells 150, and which of the plurality of hubs 160 are active as a function of time, thereby supporting a wireless communication link between the base station 120 and the plurality of hubs of the cell area corresponding with the active directional wireless link 171, 172, 173, 174. Further, the controller provides the cell map to the base station 120 and the plurality of hubs 160 of each of the cells 150.

As shown, the cell map 140 includes an indication for each cell (for example, cells 1, 2, 3, 4), an activation time (such as, activation times 5', 6', 7', 8'), a carrier frequency (such as, frequencies A, B, C, D), and hubs within the active cells. For example, when cell 1 is active, hubs H1, H2 are active. When cell 2 is active, hubs H3, H4, H5 are active. When cell 3 is active, hub H6 is active. When cell 4 is active, hubs H7, H8, H9 are active.

FIG. 1 shows an exemplary mapping in which a first directional wireless link 1 117 is mapped to be active at a first time t1, a second directional wireless link 2 172 is mapped to be active at a second time t2, a third directional wireless link 3 173 is mapped to be active at a third time t3, and a fourth directional wireless link 4 174 is mapped to be active at a fourth time t4. For an embodiment, the cell map includes a repeating cycle in which the different directional wireless links are each activated.

For at least some embodiments, multiple cells may be simultaneously active at a time according to the cell map. For an embodiment, the cell mapping corresponds with spatial scanning of beam directions (also referred to as beam hopping). For an embodiment, the cell map is generated based on network characteristics, such as, a network traffic density, applications being served by the hubs, or characteristics of hubs within a cell. For an embodiment, the amount of active time for each cell according to the cell map may be non-uniform and can also be generated based upon the network characteristics. For an embodiment, the cell map allocates additional active time for cells with higher traffic density (greater data traffic demands), and less active time for cell with less traffic density. For an embodiment, the time between active cell mappings is coordinated with the application being serviced on hubs in that cell. For example, hubs in a cell A may be sold as part of a 10-minute periodicity update location tracking service. Therefore, the cell map ensure the cell A is activated at least once every 10 minutes to satisfy the service requirement.

As described, the cell map is provided to the base station 120 and the plurality of hubs 160 of the cells 150. Based on the cell map the base station 120 and each of the plurality of hubs to know when to wirelessly communicate with each other. The communication of the cell map (and other data) from the controller to the hubs can be through the base station, but may also be through other network paths (for example, through a cellular wireless connection to the hubs). Further, for an embodiment, only a portion of the cell map is communication to a hub. That is, the cell map includes information pertaining to much more than just a single hub. For an embodiment, information of the cell map not related to a particular hub does not need to be communicated to that particular hub.

As previously stated, for an embodiment, the cell map additionally includes wireless communication carrier frequencies mapped to each of the plurality of cells. The hubs within each of the cells can use the known (mapped) wireless communication carrier frequencies to initiate and maintain a wireless connection. Hubs may also scan across a known frequency range to initiate and maintain a wireless connection.

For an embodiment, the base station and a hub use the cell map to maintain a connection state of the hub between beam hops (changes in the activation of the active directional wireless links). For an embodiment, this includes the base station maintaining an RRC (radio resource connection) connection state of the hub between hops (changes) of the directional wireless link activation so that hub does not need to go through an entire connection process every time the beam hops. For this embodiment, the base station does not send a paging signal to hub when the hub is not in the coverage area of the active directional wireless link of the base station. For an embodiment, the connection and state of the hub related to a timeout is modified to support the active directional link schedule of the cell map. Accordingly, more hubs are kept in a connected state because a RNTI (radio network temporary identifier) can be re-used. Further, the hubs are being not disconnected because of lack of activity due to cell inactivation because disconnect timeouts are coordinated with cell map and hubs in cells.

An embodiment includes spatially overlapping cells which can operate on the same carrier frequency (moving-cell) or different carrier frequencies when uniform coverage or improved cell-edge performance is needed. In case of "moving-cell", only the coverage area is shifted creating a virtually large cell.

An embodiment includes allowing some or all hubs to have a fallback (utilized, for example, when the cell map information is not available yet or the hub fails to connect with the cell for more than a certain period of time) option where the hubs perform a period scan of certain carrier frequencies (which could be configured, for example, in device firmware or SIM profile) and "learn" (a kind of AI), among other things, the cell map so that hubs can predict the time when the cell to which the hub belongs would be active. For an embodiment, when a cell map is not received, the hub can generate its own map based upon observed timing of network availability as perceived by the reception of reference signals/system information blocks. For an embodiment, if a hub does not receive the cell map, the hub can still connect to the base station by listening (scanning for reception of wireless signals) for the available network over a time period (for example, 30 minutes) based upon hearing (wirelessly receiving) reference signals or system information blocks. The hub then fits the timings of wirelessly receiving these signals to a model to produce a localized cell map.

Figure 2:
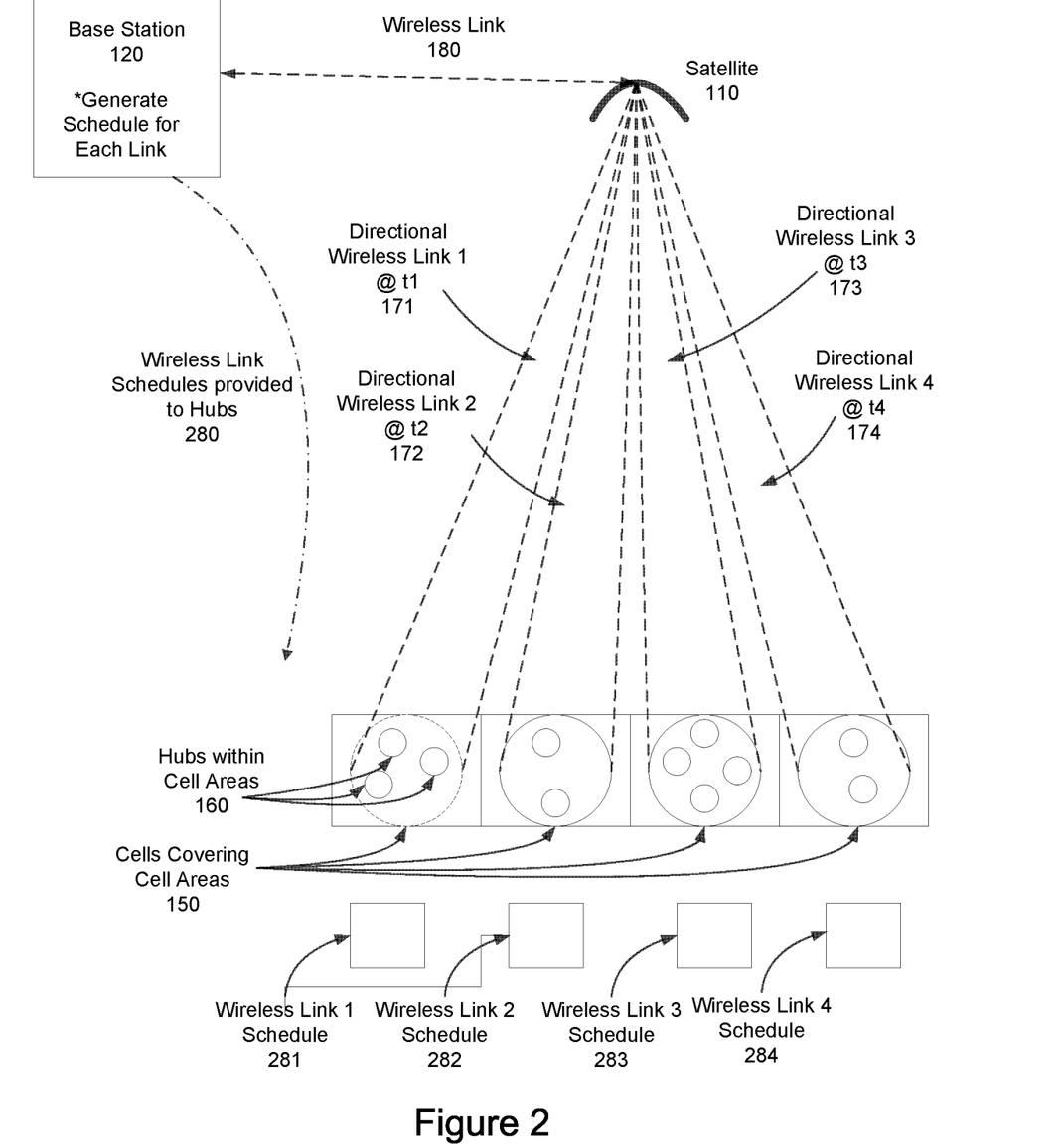
FIG. 2 shows a base station generating schedules for each of a plurality of directional wireless links, and communicating the schedules to the hubs, according to an embodiment.

FIG. 2 shows a base station 120 generating schedules for each of a plurality of directional wireless links, and communicating 280 the schedules to the hubs 160, according to an embodiment. As previously described, the cell map 140 maps which of the plurality of directional wireless links 171, 172, 173, 174, which of the plurality of plurality cells 150, and which of the plurality of hubs 160 are active as a function of time, thereby supporting a wireless communication link between the base station 120 and the plurality of hubs of the cell area corresponding with the active directional wireless link 171, 172, 173, 174. An embodiment further includes the base station 120 operating or configured to coordinate timing of transmissions between the base station 120 and the plurality of hubs 160 of each cell area during activation of the corresponding directional wireless link. That is, the base station 120 coordinates the communication between the base station and the plurality of hub of the activated directional wireless link. For an embodiment, the coordination includes scheduling of the timing of the wireless communication (downlink and uplink) between the base station and the hubs.

For an embodiment, the base station further operates to coordinate the frequency of transmissions between the base station and the plurality of hubs of each cell area during activation of the corresponding directional wireless link. That is, not only may the base station coordinate the timing of the communication between the base station and the hubs of the active directional link, the base station can additionally or alternatively coordinate the frequency of the wireless communication between the base station and the hubs during activation of each of the directional wireless links.

For an embodiment, the base station 120 further operates to generate a schedule (such as, schedules 281, 282, 283, 284) of the coordinated timing of the of transmissions between the base station and the plurality of hubs of each cell area during activation of the corresponding directional wireless link. Further, for an embodiment, the base station operates to provide 280 the schedule(s) (281, 282, 283, 284) to each of the plurality of hubs.

An embodiment includes the plurality of hubs controlling timing of transmission and reception of wireless communication with the base station based on the cell map generated by the controller, and additionally based on the schedule generated by the base station. That is, the wireless communication between the base station and each of the plurality of hubs is controlled by both the cell map and the corresponding schedule.

For an embodiment, the plurality of hubs within the cell area of non-active cells corresponding with directional links of the plurality of directional wireless links that are not activated delay transmissions and reception of wireless communication with the base station based on the cell map. That is, sensors associated with a hub may generate sensed data for the hub which is to be communicated upstream to the base station. However, at the time the sensed data is generated, the hub may be in an inactive state. Accordingly, if the hub is within a non-active cell, the hub delays transmission of the sensed data until the cell the hub is within becomes active again. Correspondingly, for an embodiment, the base station delays transmissions and reception of wireless communication with the plurality of hubs within the cell area of non-active cells corresponding with directional links of the plurality of directional wireless links that are not activated based on the cell map.

At least some embodiments include coordinating data transmission and spooling of the hubs based on the cell map. That is, the process of beam hopping as directed by the cell map is coordinated with the hubs so that the hubs only transmit and de-spool packets when the hubs are within coverage of a beam of an active directional wireless link. For an embodiment, the hubs hold (spool) data (for example, sensed data) when the base station is not available.

For at least some embodiments, one or more of the plurality of hubs coordinate sleep cycles based on the cell map. That is, while the hub is inactive the hub can go into a sleep state in which portions of electronic circuitry of the hub can be deactivated to save power. That is sleep cycles of the hubs is coordinated with the beam hopping (the sequence of active cells) as specified by the cell map. As previously stated, the hub is deactivated and can enter a sleep cycle when the cell map directs deactivation of the directional wireless link that corresponds with the cell that the hub is located within.

For at least some embodiments, one or more of the plurality of hubs coordinates communication with navigational satellites based on the cell map. For an embodiment, the one or more of the plurality of hubs has a single RF (radio frequency) chain for transmitting and receiving wireless signals. Therefore, for this embodiment, the hub must pick between communicating over satellite wireless link or listening (receiving) to navigation satellite signals (such as, GNSS (Global Navigation Satellite System)). Hubs in active cells must choose between communicating with the base station or receiving GNSS signals, which may degrade the GNSS performance. Hubs in inactive cells can prioritized GNSS which can result in improved GNSS performance.

For at least some embodiments, the base station further operates to maintain a list of hubs within each of the cell areas, and coordinate schedule generation based on the maintained list. For an embodiment, the base station further operates to update the list and the schedule based on movement of hubs from one cell area to another cell area. For an embodiment, the base station maintains a list of devices (including hubs) within the cell area of a beam and provides device (including hub) availability information to controller.

For at least some embodiments, one or more of the hubs perform a startup process including cell search and synchronization, antenna searching, and navigation satellite acquisition for uplink timing synchronization based on the cell map. Performing the startup process based on the cell map provides for maximum connectivity time with the base station.

For at least some embodiments, one or more hubs operate to prioritize types of wireless communication based on the cell map. That is, during activation of the cell that the hub belongs to, wireless communication with the base station through the satellite may be prioritized. However, when the cell that the hub is located within is not active, the hub may prioritize other types of wireless communication. For example, for an embodiment, the one or more hubs prioritize other (for example, cellular) communication when the cell area of the one or more hubs is not activated.

As described, the controller communicates the cell map to the base station and the hubs. For an embodiment, the controller communicates the cell map to the hubs through the base station. For an embodiment, the base station communicates the cell map to each of the hubs through multicast or broadcast transmissions. The cell map may change over time. Further, the cell map may need to be communicated to many hubs at the same time. Multicast and/or broadcast communication of the cell map can allow a large number of hubs to quickly and efficiently receive the cell map.

For at least some embodiments, the base station operates to communicate the cell map and a channel range to the plurality of hubs. For an embodiment, one or more of the hubs perform a cell search only in the channel range provided. That is, once the hub knows the channel range, the hub knows what frequencies to search in order to identify a cell that the hub may attempt or obtain a wireless connection.

For at least some embodiments, the base station re-uses RNTI (radio network temporary identifier) and other unique identifiers between the plurality of hubs in spatial disparate cells to control the communication of data. For an embodiment, the base station signals the hub it is communicating with via unique identifiers (such as, RNTI). However, due to complexity and overhead limitations the number of unique identifiers available is limited. These identifiers can be re-used if they can be transmitted over an area where two hubs with the same assignment cannot receive messages (interference) meant for the other. Spatially disparate cells are less likely to suffer interference between the cells. Cells can be determined to be spatially disparate if communication from one cell does not interfere with communication of the other cell.

Figure 3:
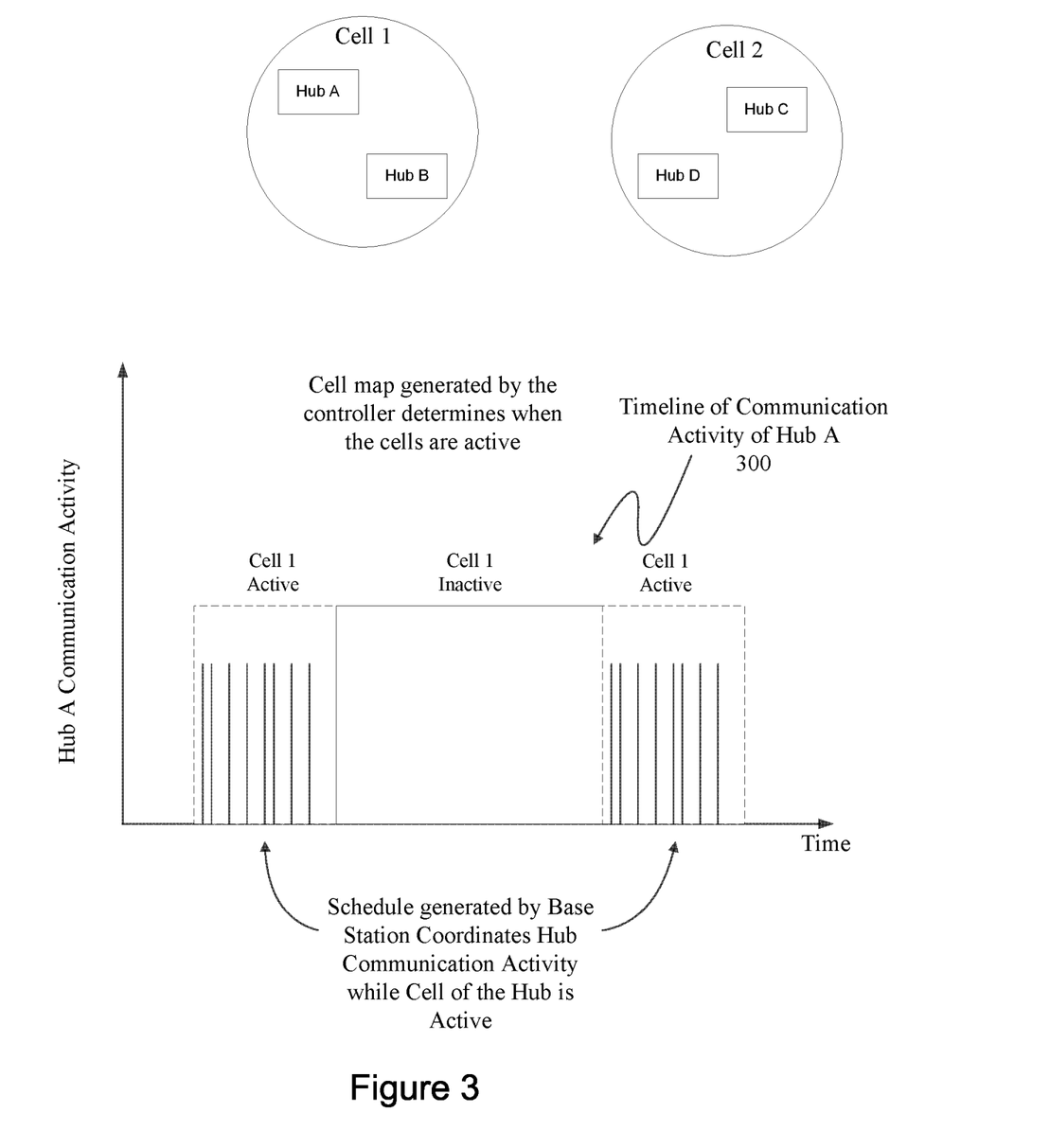
FIG. 3 shows a timeline of communication activity of a hub as controlled by a cell map generated by a controller, and a schedule generated by a base station, according to an embodiment.

FIG. 3 shows a timeline 300 of communication activity of a hub as controlled by a cell map generated by a controller, and a schedule generated by a base station, according to an embodiment. As shown, according to the cell map, there are time periods in which a cell 1 is active (communication by the base station with hubs occurs within cell 1), and there are time periods in which the cell 1 is inactive (no communication by the hubs within the cell 1). As shown, a particular hub (Hub A) is located within the cell area of cell 1. Further, according to the schedule generated by the base station, the Hub A communicates with the base station during the time period in which the cell 1 is active. The wireless communication between the base station and the Hub A includes wireless downlink communication from the base station to the Hub A, and uplink wireless communication from the Hub A to the base station. As directed by the cell map, the Hub A does not communicate during the time period in which the cell 1 is inactive.

Figure 4:
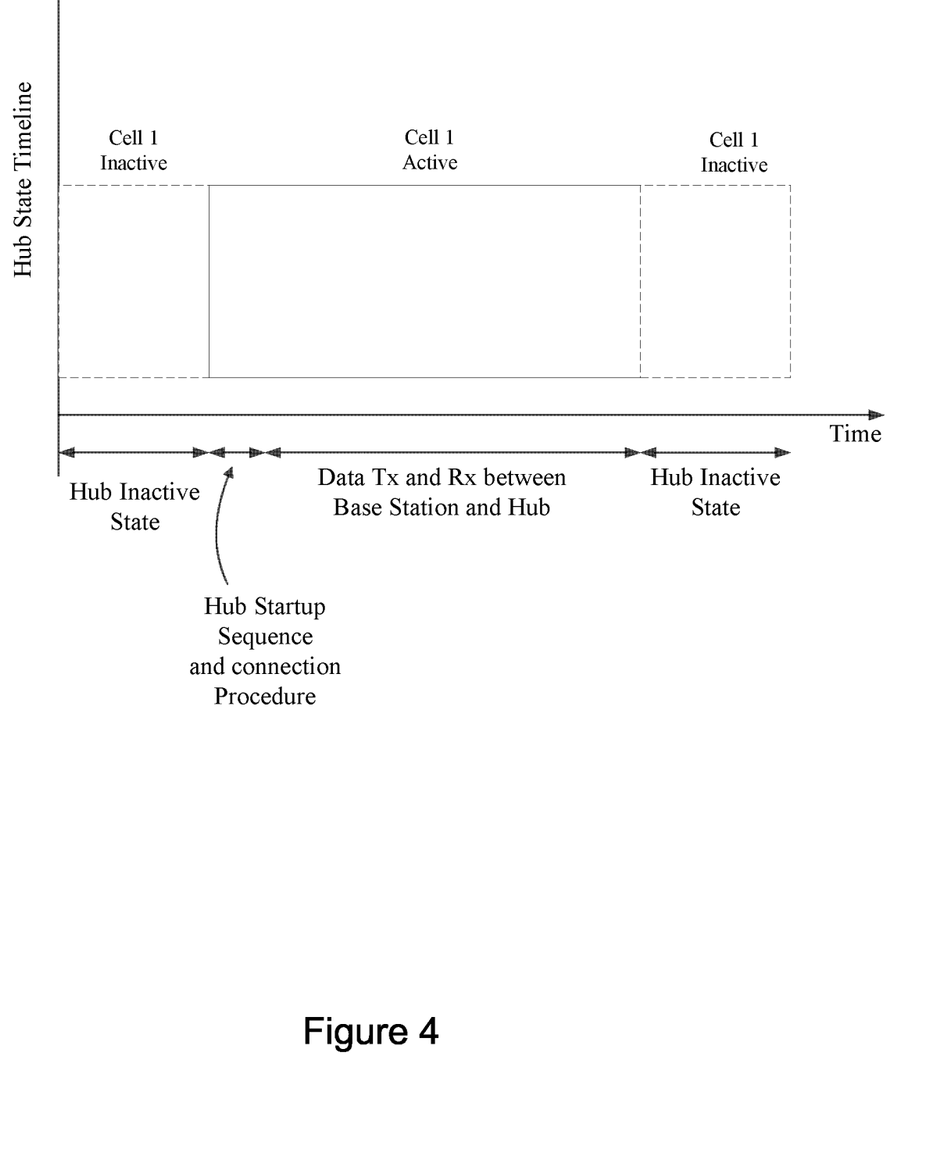
FIG. 4 shows a hub state timeline, according to an embodiment.

FIG. 4 shows a hub state timeline, according to an embodiment. As shown, the hub state timeline includes an inactive state, a setup and connection state, and a communication state. The inactive state occurs when the cell map indicates that the hub is inactive because the directional wireless link of the cell in which the hub is located is inactive. The setup and connection state occurs upon the hub reaching the active state. For an embodiment, for the setup and connection state, the hub performs a startup procedure to maximize wireless channel utilization during cell active time. For an embodiment, the hub reloads a base station context after synchronizing with base station. This helps in minimizing the cell connection overhead and helps in maintaining the hub in a connected state between beam hops. For example, the hub may retain RNTI information. The hub startup and connection period can also include a cell search and antenna steering optimizations.

Figure 5:
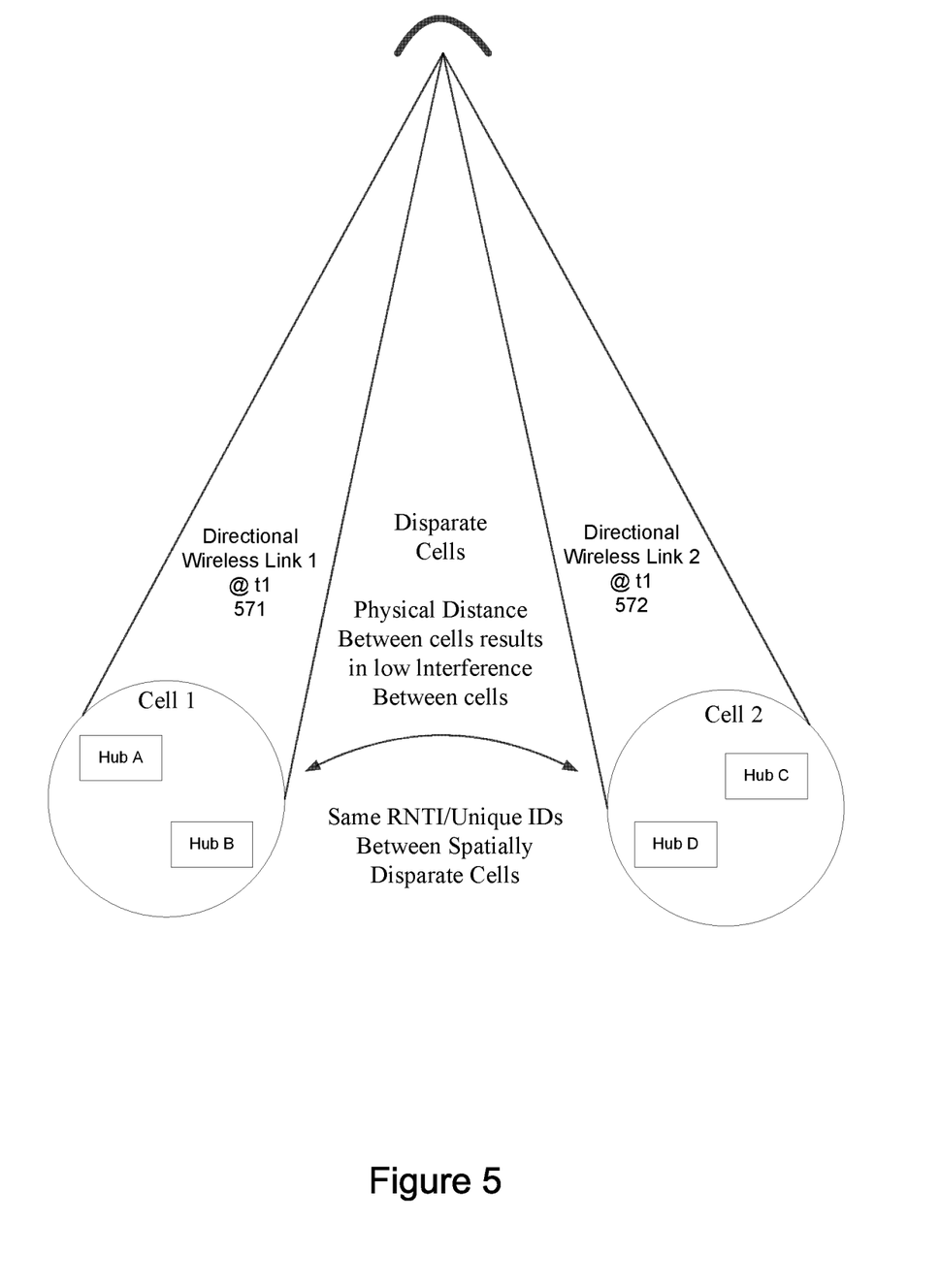
FIG. 5 shows disparately located cells and simultaneous operation of the disparately located cells, according to an embodiment.

FIG. 5 shows disparately located cells (Cell 1, Cell 2) and simultaneous operation of the disparately located cells, according to an embodiment. According to the cell map, both directional wireless links (Link 1 571, Link 2 572) are active at a time t1. Accordingly, Cell 1 and Cell 2 are active, as are the hubs Hub A, Hub B, Hub C, and Hub D located within Cell 1 and Cell 2. For an embodiment, the Cell 1 and the Cell 2 are spatially disparate when interference between the cells is below an interference threshold. Accordingly, wireless communication between the base station and the hubs of Cell 1 does not interfere (below the threshold) with wireless communication between the base station and the hubs of Cell 2, and wireless communication between the base station and the hubs of Cell 2 does not interfere (below the threshold) with wireless communication between the base station and the hubs of Cell 1.

As was previously described, for at least some embodiments, the base station re-uses RNTI (radio network temporary identifier) and other unique identifiers between the plurality of hubs in spatial disparate cells to control the communication of data. For an embodiment, the base station signals the hub it is communicating with via unique identifiers (such as, RNTI). However, due to complexity and overhead limitations the number of unique identifiers available is limited. These identifiers can be re-used if they can be transmitted over an area where two hubs with the same assignment cannot receive messages (interference) meant for the other. Spatially disparate cells are less likely to suffer interference between the cells. Cells can be determined to be spatially disparate if communication from one cell does not interfere with communication of the other cell.

Figure 6:
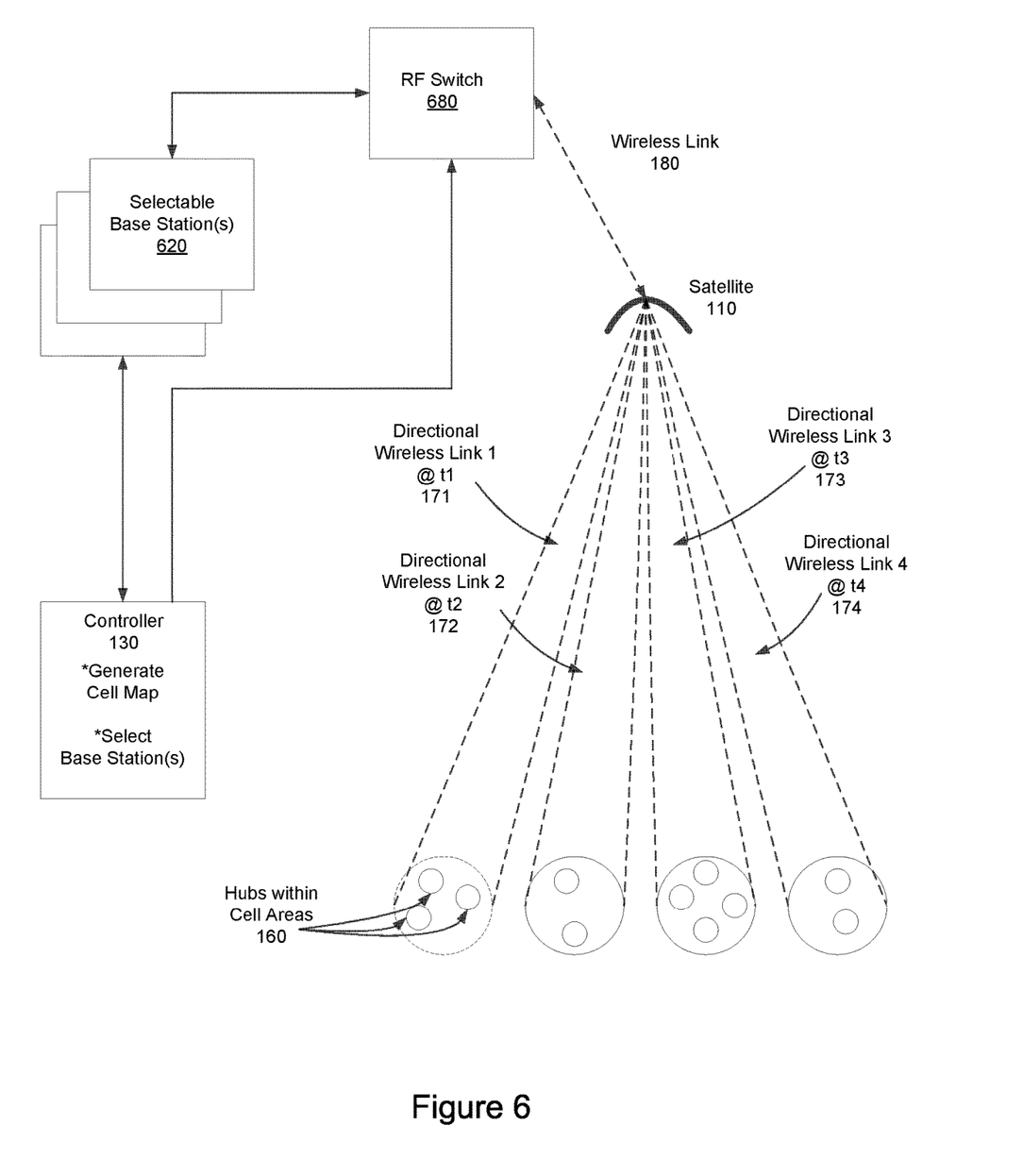
FIG. 6 shows multiple base stations, wherein one of the base stations is selected to be connected to the satellite, according to an embodiment.

FIG. 6 shows multiple base stations 620, wherein one of the base stations is selected to be connected to the satellite 110, according to an embodiment. For an embodiment, the controller 130 selects which of the base stations 620 is connected to the satellite using an RF (radio frequency) switch 680. For an embodiment, the RF switch 680 is an electro-mechanical/electronic 1: N switch. The base station connected to the satellite operates as previously described. For this embodiment, the controller generates the cell map, and additionally, selects which base station 620 is communicating with the hubs through the satellite 110. For an embodiment, the base station may change its output frequency in accordance with the cell map.

Figure 7:
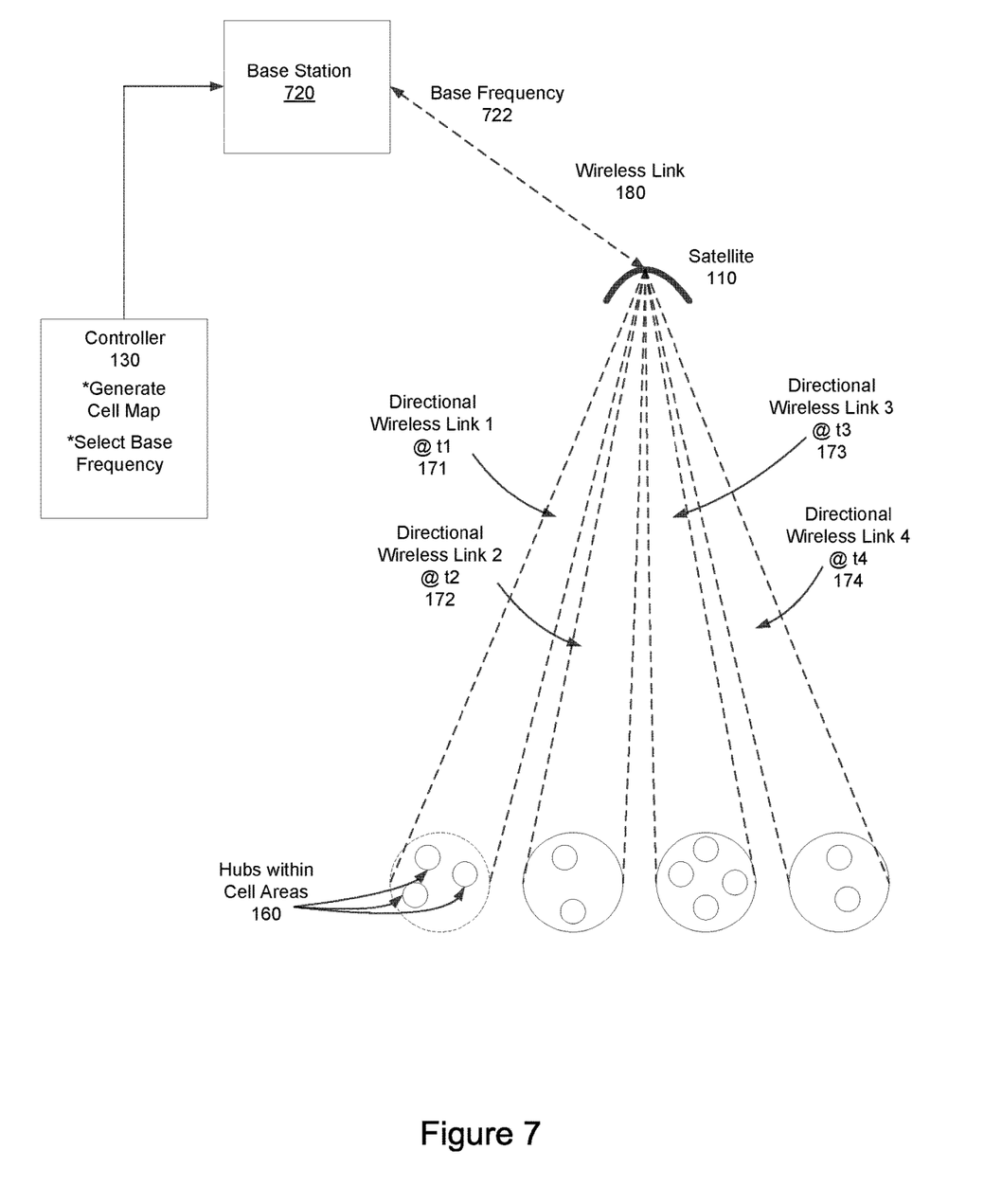
FIG. 7 shows a base station that switches between cells, according to an embodiment.

FIG. 7 shows a base station 720 that switches between cells, according to an embodiment. For an embodiment, the base station 720 switches between cells by converting its base frequency using an external RF Converter. For this embodiment, the controller 130 selects the frequency of the cell.

For an embodiment, the base station 720 switches between cells by changing its base frequency to match the cell frequency via direct commands from the controller 130. For this embodiment, the controller 130 directly commands the base station 720 to tune to the frequency of the cell.

Figure 8:
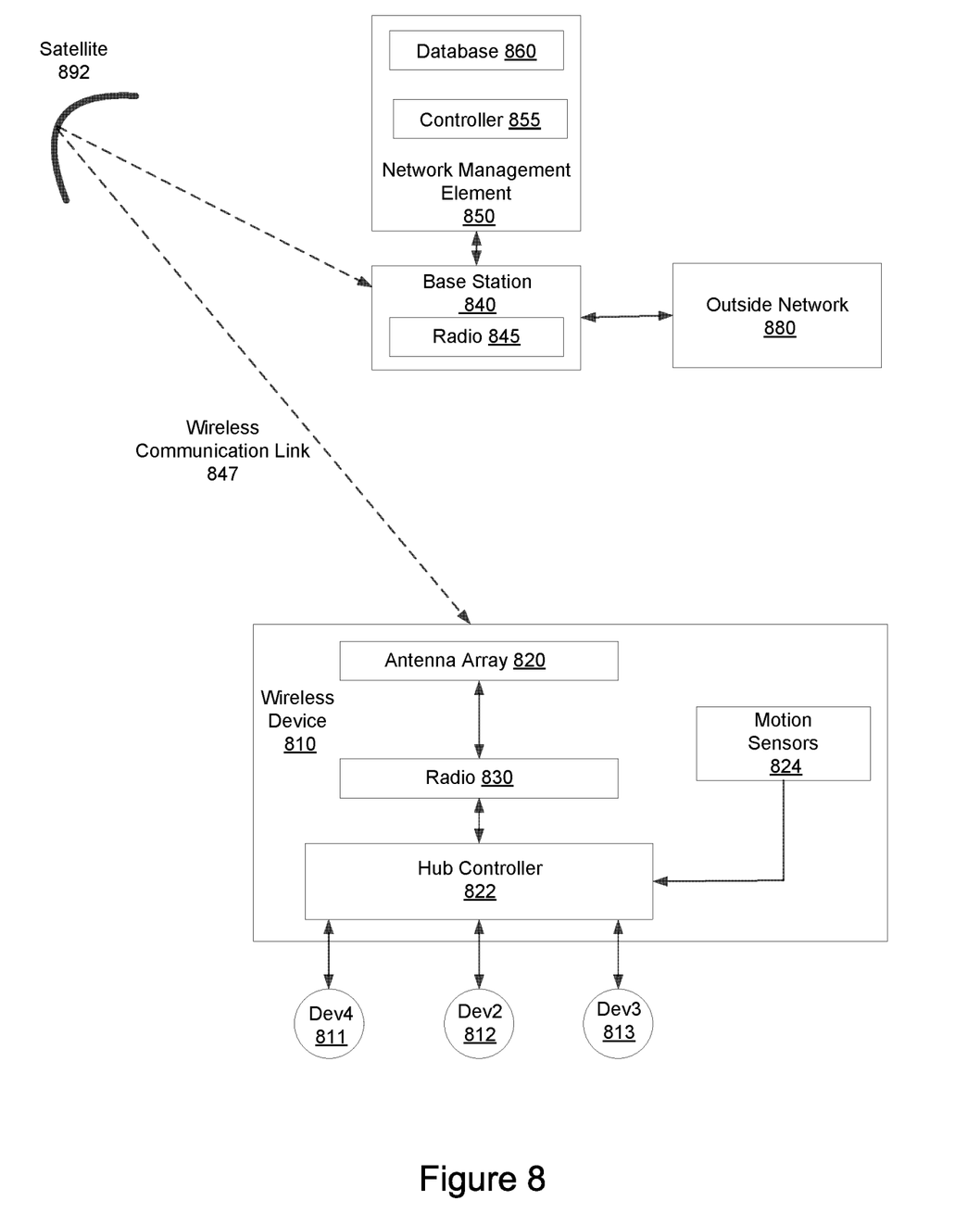
FIG. 8 shows a wireless device operating to communicate with a base station through a satellite, according to an embodiment.

FIG. 8 shows a wireless device 810 (which can be one of the previously described hubs) operating to communicate with a base station 840 through a satellite 892, according to an embodiment. For at least some embodiments, the wireless device 810 is a mobile device. For an embodiment, the wireless device 810 is able to communicate with an outside network 880 through the base station 840. Further, the base station 840 is able to communication with a network management element 850 that includes the controller 855 and a database 850. The operations of FIG. 8 include a base station communicating through one of the active directional links to the corresponding active hubs. The controller 855 operates to generate the cell map.

Further, for at least some embodiments, an antenna array 820 of the wireless device 810 forms a directional beam that facilitates a wireless communication link 847 through the satellite 892 to the base station 840. Due to motion of the wireless device 810, the direction of the directional beam needs to be updated over time. The wireless communication between the wireless device 810 and the base station 840 is also enabled by a radio 830 of the wireless device 810 and a radio 845 of the base station 840.

For at least some embodiments, the wireless device 810 includes motion sensors 824. Further, the wireless device 810 includes a Hub controller 822 that receives the sensed motion from the motion sensors 824, and adapts a direction of the directional beam formed by the antenna array 820 accordingly.

For at least some embodiments, the Hub controller 822 operates to determine a direction of the wireless link to the satellite 892 from the wireless device 810 based on one or more measured signal metrics (for example, RSSI) of wireless communication (through the wireless communication link 847) with the base station 840. The Hub controller 822 further operates to select at least one of a plurality of beamforming direction settings of the multiple antenna array 820 of the radio 830 of the wireless device 810. For an embodiment, the one or more measured signal metrics are measured according to the cell map. That is, the measurements are synchronized with the cell map.

The motion sensors 824 sense motion of the wireless device 810. The Hub controller 822 uses the sensed motion to measure motion of the wireless device relative to the determined wireless link direction.

Further, the Hub controller 822 operates to select a one of the plurality of beamforming settings for communicating with the base station based on the determined wireless link direction, a one of the plurality of beamforming settings that corresponds with the determined wireless link direction, and the sensed motion relative to the reference orientation.

For at least some embodiments, the Hub controller 822 further operates to receive data from connected data sources 811, 812, 813. The controller collects the received data, and communicates the collected data to the base station 840 through the wireless link 847. For an embodiment, the base station 840 provides the collected data to an outside network 880. For an embodiment, the base station 840 accesses a network management element 850 that includes a database 860 of information that can be used for aiding the communication of the collected data from the data sources 811, 812, 813, through the wireless device 810, to the base station 840.

Figure 9:
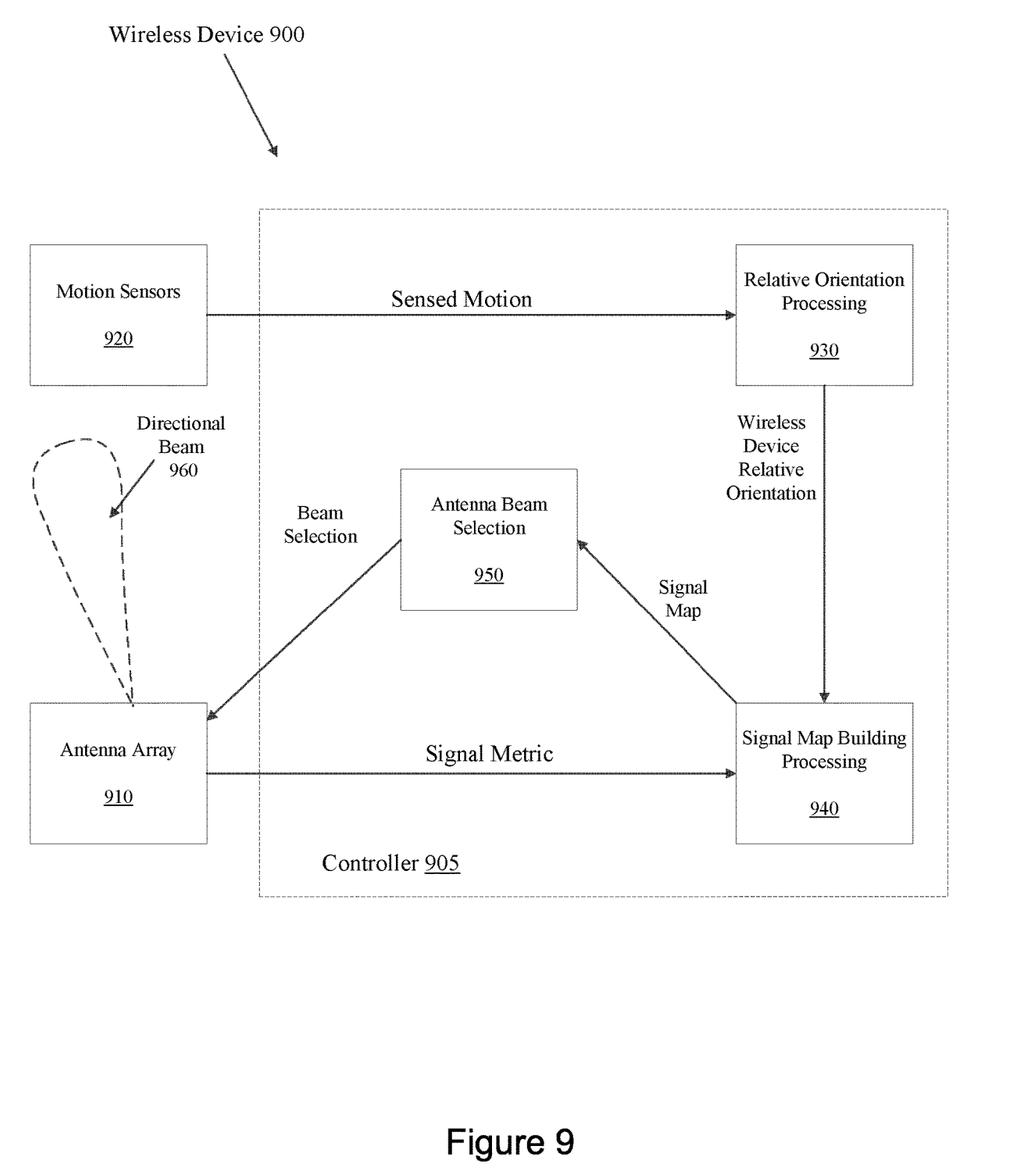
FIG. 9 shows a block diagram of a wireless device that includes control of antenna steering of the wireless device, according to an embodiment.

FIG. 9 shows a block diagram of a wireless device (hub) that includes control of antenna steering of the wireless device, according to an embodiment. For at least some embodiments, the plurality of hubs within the plurality of cells areas coordinate the use of RSSI measurements (as part of signal map building process, wherein the signal map building process must be coordinated with cell map, and performed during cell activation) to tune antenna gain patterns of antennas of the hub with the cell map. For an embodiment, the tuning of the antenna patterns is controlled by an N-axis (for an embodiment, N=6) IMU (inertial measurement unit). The hubs can be subject to motion and the N-axis IMU is used to control the tuning of the antenna gain patterns of the antennas of the hub. Further, a received signal strength of received satellite signals can additionally be used for controlling the tuning. For an embodiment, during in-active cell times, the hubs operate their steering using the open loop 6-axis data inputs, and during active cell times the hubs additional include RSSI (receive signal strength indicator) data to eliminate integrated error. For an embodiment, an antenna steering algorithm of the hub uses a scan mode to find the direction (antenna pattern direction) with maximum signal strength, and IMU information is used to track the direction in which best signal strength was measured. Since, the satellite signal is available only when RF beam is available, the antenna steering remains in tracking mode when the RF beam is not available and scan mode is enabled when RF signal is available. Therefore, an antenna steering state machine is updated to coordinate with beam hopping provided by the cell map.

As shown, an antenna array 910 forms a directional beam 960. For an embodiment, the direction of the directional beam 960 is adjustable to multiple directions.

As shown, a communication signal metric (for example, received signal strength) is measured during the activation time of the wireless device (hub) 900. For an embodiment, signal map building processing of a controller 905 of the wireless device 900 (for example, a hub) receives the signal metric. For an embodiment, a value of the signal metric is dependent on how well the directional beam 960 is aligned with the direction of the wireless link between the wireless device 900 and the base station. It is to be understood that the wireless link may be a LOS (line-of-sight) wireless link or a NLOS (non-line-of-sight) wireless link. Either way, the wireless link is in a direction that provides a quality (better than a threshold) wireless link between the wireless device 900 and the base station.

As the wireless device 900 changes its physical orientation, the alignment of the directional beam 960 with the direction of the wireless link between the wireless device 900 and the base station changes. Accordingly, the described embodiments provide for reselection of the direction of the directional beam 960 to maintain the alignment (or at least improve the alignment) of the directional beam 960 with the direction of the wireless link d the base station is influenced by both the selected direction of the directional beam 960 between the wireless device 900 and the base station.

For an embodiment, signal map building processing 940 includes tracking the signal metric (for example, RSSI) of a received signal while the orientation of the wireless device changes, and for different selections of the direction of the directional beam 960. Visually, this can be realized by a virtual sphere, wherein the mapping includes plotting the RSSI along the surface of the sphere as the physical orientation of the wireless device changes, and the selected direction of the directional beam changes. The value of the RSSI reflects the quality of the connection through the wireless link to the base station.

As shown, one or more motion sensors 920 sense changes in orientation of the wireless device 900. As previously described, for an embodiment, the motion sensors 920 include a 6-axis IMU. For an embodiment, the 6-axis IMU includes a 3-axis accelerometer and a 3-axis gyroscope. For an embodiment, the sensed motion is provided to relative orientation processing 930 of the controller 905 of the wireless device 900.

The relative orientation processing 930 provides an input to the signal map building processing 940 that reflects the orientation of the wireless device. For an embodiment, the relative orientation processing 930 provides an input to the signal map building processing 940 that reflects the orientation of the wireless device relative to the determined direction of the wireless link to the satellite.

A signal map is provided to an antenna beam selector 950 which selects the beamforming direction selection of the antenna array 910.

Figure 10:
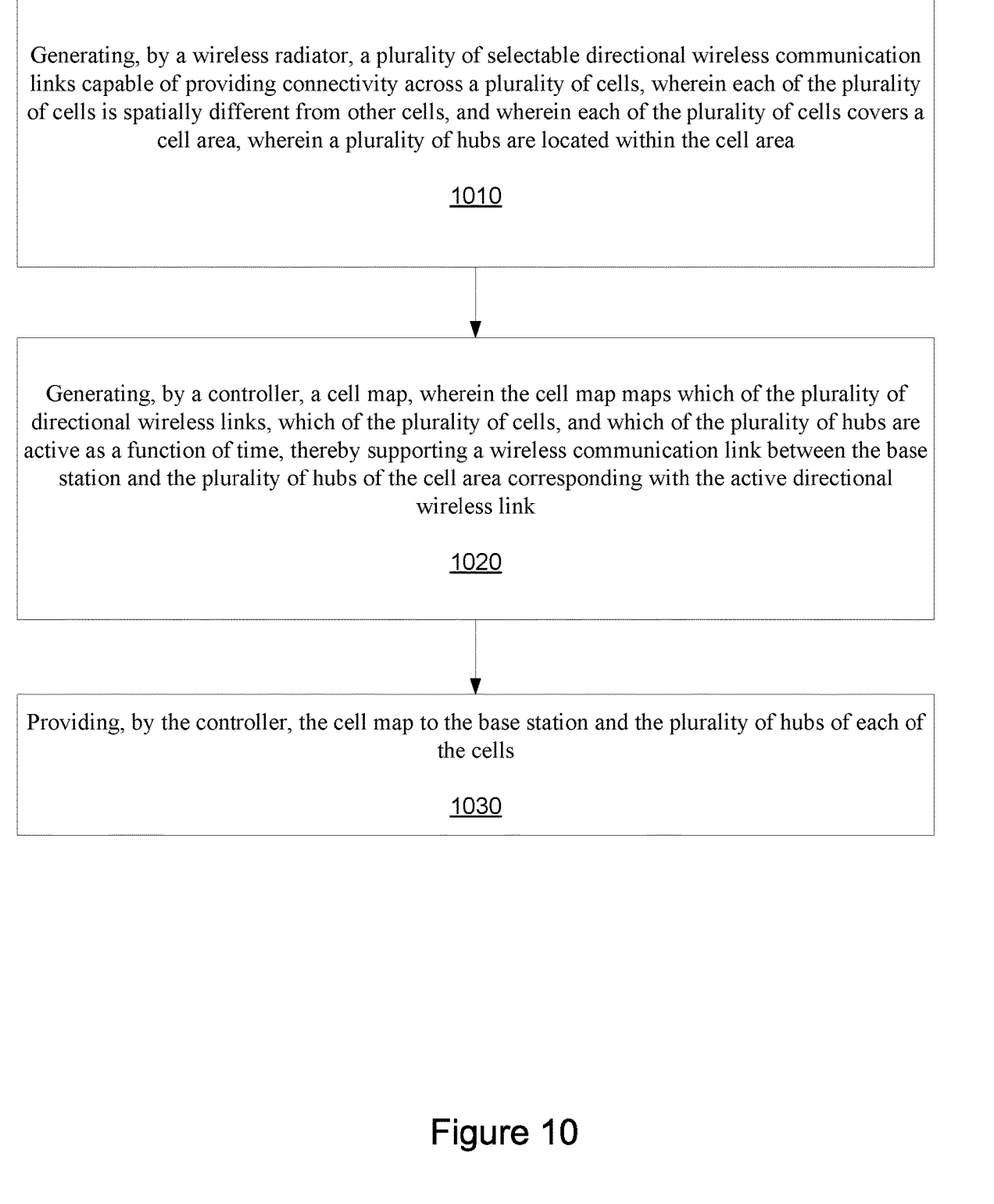
FIG. 10 is a flow chart that includes steps of a method for coordinating wireless communication between a base station and a plurality of hubs, according to an embodiment.

FIG. 10 is a flow chart that includes steps of a method for coordinating wireless communication between a base station and a plurality of hubs, according to an embodiment. A first step 1010 includes generating, by a wireless radiator, a plurality of selectable directional wireless communication links capable of providing connectivity across a plurality of cells, wherein each of the plurality of cells is spatially different from other cells, and wherein each of the plurality of cells covers a cell area, wherein a plurality of hubs are located within the cell area. A second step 1020 includes generating, by a controller, a cell map, wherein the cell map maps which of the plurality of directional wireless links, which of the plurality of cells, and which of the plurality of hubs are active as a function of time, thereby supporting a wireless communication link between the base station and the plurality of hubs of the cell area corresponding with the active directional wireless link. A third step 1030 includes providing, by the controller, the cell map to the base station and the plurality of hubs of each of the cells.

As previously described, for an embodiment the cell map additionally includes wireless communication carrier frequencies mapped to each of the plurality of cells.

As previously described, an embodiment further includes coordinating timing of transmissions between the base station and the plurality of hubs of each cell area during activation of the corresponding directional wireless link. As previously described, an embodiment further includes coordinating a frequency of transmissions between the base station and the plurality of hubs of each cell area during activation of the corresponding directional wireless link. As previously described, an embodiment further includes generating, by the base station, a schedule of the coordinated timing of the of transmissions between the base station and the plurality of hubs of each cell area during activation of the corresponding directional wireless link, and provide the schedule to each of the plurality of hubs. As previously described, an embodiment further includes the plurality of hubs controlling timing of transmission and reception of wireless communication with the base station based on the cell map generated by the controller and the schedule generated by the base station.

As previously described, an embodiment further includes the plurality of hubs within the cell area of non-active cells corresponding with directional links of the plurality of directional wireless links that are not activated delaying transmissions and reception of wireless communication with the base station based on the cell map. As previously described, an embodiment further includes the base station delaying transmissions and reception of wireless communication with the plurality of hubs within the cell area of non-active cells corresponding with directional links of the plurality of directional wireless links that are not activated.

As previously described, an embodiment further includes coordinating, by the plurality of hubs, sleep cycles based on the cell map. As previously described, an embodiment further includes coordinating, by the plurality of hubs, communication with navigational satellites based on the cell map.

As previously described, an embodiment further includes maintaining, by the base station, a list of hubs within each of the cell areas, and coordinate schedule generation based on the maintained list. As previously described, an embodiment further includes updating, by the base station, the list and the schedule based on movement of hubs from one cell area to another cell area.

As previously described, an embodiment further includes performing, by one or more hubs, a startup process including cell search and synchronization, antenna searching, and navigation satellite acquisition for uplink timing synchronization based on the cell map.

As previously described, an embodiment further includes prioritizing, by one or more hubs, types of wireless communication based on the cell map. For an embodiment, the one or more hubs prioritize other communication when the cell area of the one or more hubs is not activated.

As previously described, an embodiment further includes communicating, by the base station, the cell map and a channel range to the plurality of hubs, and where one or more of the hubs perform a cell search in the range provided.

As previously described, an embodiment further includes coordinating, by the plurality of hubs within the plurality of cells areas, the use of RSSI measurements to tune their antenna gain patterns with the cell map.

As previously described, an embodiment further includes re-using, by the base station, RNTI (radio network temporary identifier) and other unique identifiers between the plurality of hubs in spatial disparate cells to control the communication of data.

Although specific embodiments have been described and illustrated, the embodiments are not to be limited to the specific forms or arrangements of parts so described and illustrated. The described embodiments are to only be limited by the claims.

What is claimed:

1. A system for coordinating wireless communication between a base station and a plurality of hubs, comprising:
   a wireless radiator, the wireless radiator operative to:
   generate a plurality of selectable directional wireless communication links capable of providing connectivity across a plurality of cells, wherein each of the plurality of cells is spatially different from other cells, and wherein each of the plurality of cells covers a cell area, wherein a plurality of hubs are located within the cell area;
   a controller, the controller operative to:
   generate a cell map, wherein the cell map maps which of the plurality of selectable directional wireless communication links, which of the plurality of cells, and which of the plurality of hubs are active as a function of time, thereby supporting a wireless communication link between the base station and the plurality of hubs of the cell area corresponding with an active directional wireless link; and
   provide the cell map to the base station and the plurality of hubs of each of the cells;
   wherein the base station operates to:
   coordinate timing of transmissions between the base station and the plurality of hubs of each cell area during activation of a corresponding directional wireless link;
   generate a schedule of the coordinated timing of the of transmissions between the base station and the plurality of hubs of each cell area during activation of the corresponding directional wireless link; and
   provide the schedule to each of the plurality of hubs.

2. The system of claim 1, wherein the cell map additionally includes wireless communication carrier frequencies mapped to each of the plurality of cells.

3. The system of claim 1, wherein the base station further operates to coordinate a frequency of transmissions between the base station and the plurality of hubs of each cell area during activation of the corresponding directional wireless link.

4. The system of claim 1, further comprising the plurality of hubs controlling timing of transmission and reception of wireless communication with the base station based on the cell map generated by the controller and the schedule generated by the base station.

5. The system of claim 1, further comprising the plurality of hubs within the cell area of non-active cells corresponding with directional links of the plurality of directional wireless links that are not activated delaying transmissions and reception of wireless communication with the base station based on the cell map.

6. The system of claim 1, further comprising the base station delaying transmissions and reception of wireless communication with the plurality of hubs within the cell area of non-active cells corresponding with directional links of the plurality of directional wireless links that are not activated.

7. The system of claim 1, further comprising the plurality of hubs coordinating sleep cycles based on the cell map.

8. The system of claim 1, further comprising the plurality of hubs coordinating communication with navigational satellites based on the cell map.

9. The system of claim 1, wherein the base station further operates to maintain a list of hubs within each of the cell areas, and coordinate schedule generation based on the maintained list.

10. The system of claim 9, wherein the base station further operates to update the list and the schedule based on movement of hubs from one cell area to another cell area.

11. The system of claim 1, wherein one or more hubs perform a startup process including cell search and synchronization, antenna searching, and navigation satellite acquisition for uplink timing synchronization based on the cell map.

12. The system of claim 1, wherein one or more hubs operates to prioritize types of wireless communication based on the cell map.

13. The system of claim 12, wherein the one or more hubs prioritize other communication when the cell area of the one or more hubs is not activated.

14. The system of claim 1, wherein the base station operates to communicate the cell map to the plurality of hubs through multicast or broadcast transmissions.

15. The system of claim 1, wherein the base station operates to communicate the cell map and a channel range to the plurality of hubs, and where one or more of the hubs perform a cell search in the range provided.

16. The system of claim 1, wherein the plurality of hubs within the plurality of cells areas coordinate the use of RSSI measurements to tune their antenna gain patterns with the cell map.

17. The system of claim 1, wherein the base station re-uses RNTI (radio network temporary identifier) and other unique identifiers between the plurality of hubs in spatial disparate cells to control the communication of data.

18. A method for coordinating wireless communication between a base station and a plurality of hubs, comprising:
generating, by a wireless radiator, a plurality of selectable directional wireless communication links capable of providing connectivity across a plurality of cells, wherein each of the plurality of cells is spatially different from other cells, and wherein each of the plurality of cells covers a cell area, wherein a plurality of hubs are located within the cell area;
generating, by a controller, a cell map, wherein the cell map maps which of the plurality of selectable directional wireless communication links, which of the plurality of cells, and which of the plurality of hubs are active as a function of time, thereby supporting a wireless communication link between the base station and the plurality of hubs of the cell area corresponding with an active directional wireless link; and
providing, by the controller, the cell map to the base station and the plurality of hubs of each of the cells;
coordinating, by the base station, timing of transmissions between the base station and the plurality of hubs of each cell area during activation of a corresponding directional wireless link;
generating, by the base station, a schedule of the coordinated timing of the of transmissions between the base station and the plurality of hubs of each cell area during activation of the corresponding directional wireless link; and
providing, by the base station, the schedule to each of the plurality of hubs.

* * * * *